UNITED STATES PATENT OFFICE.

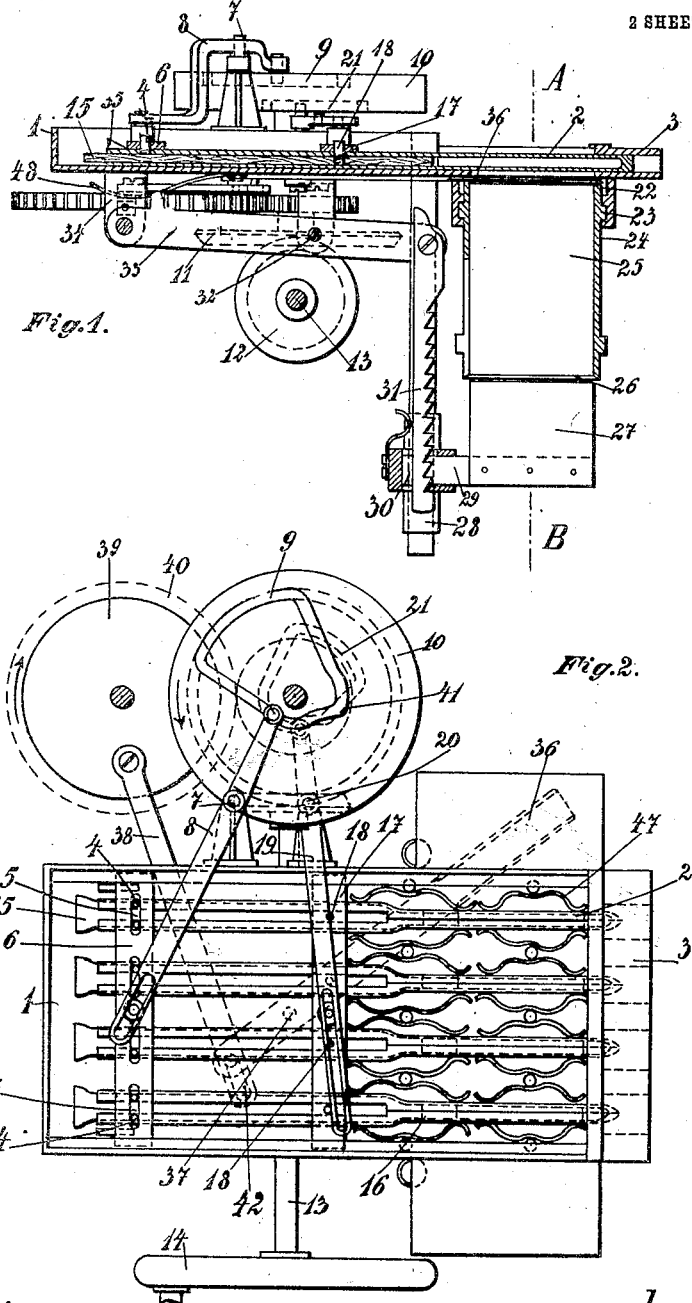

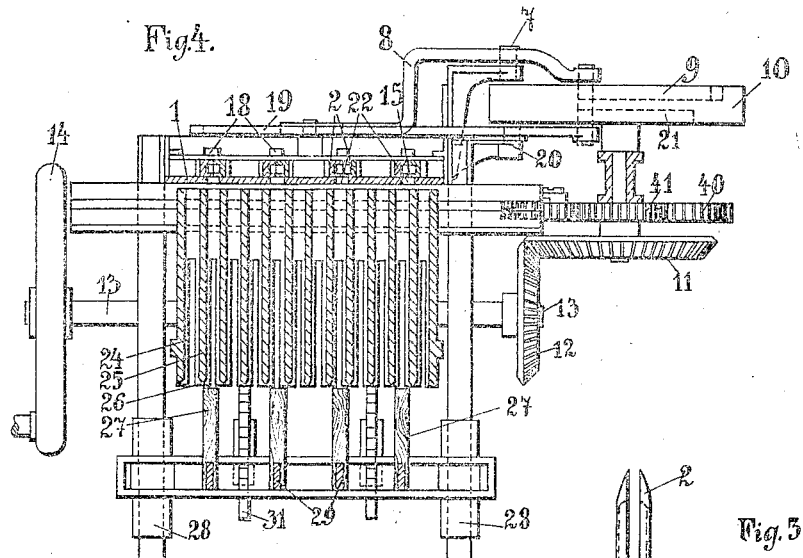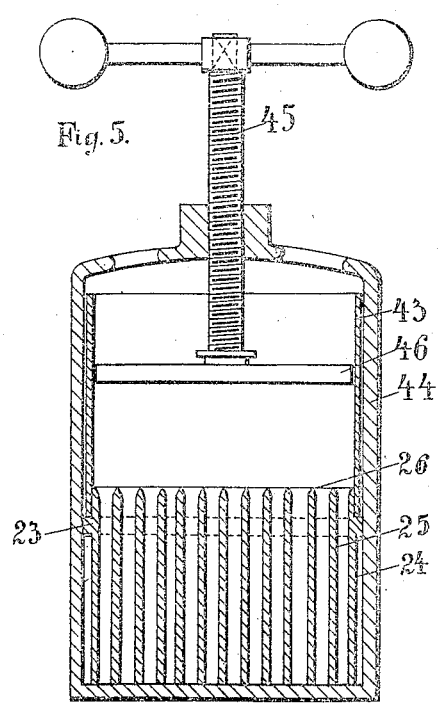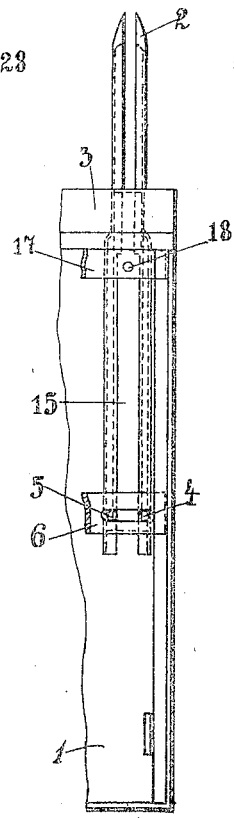

DANIEL DECHERT, OF BAD KISSINGEN, GERMANY.

MACHINE FOR LARDING MEAT AND THE LIKE.

No. 925,162.              Specification of Letters Patent.          Patented June 15, 1909.

Application filed February 5, 1907. Serial No. 355,793.

*To all whom it may concern:*

Be it known that I, DANIEL DECHERT, a subject of the German Emperor, and resident of No. 1 Theresienstrasse, Bad Kissingen, Germany, have invented certain new and useful Improvements in Machines for Larding Meat and the Like, of which the following is a specification.

The present invention relates to a device or machine which would obviate the hitherto customary employment of manual labor for larding meat or the like.

The machine works in the following way: The bacon is pressed into a casing in the action of which it is cut into slices by knives fixed in the box; the slices are then cut up into slips which are carried into hollow needles, and the latter are driven into the meat laid before the needles and then opened, so that on receding the strips of bacon are pushed out of the needles by a contrivance and remain in the meat. The needles are then filled again and the procedure is repeated.

The machine consists in the main of a series of hollow needles divided into two parts which are arranged side by side on a box which is provided with knife-like partition walls for the reception of the bacon.
Above this box, a double-edged knife is arranged which is adapted to cut the slices of bacon into strips which are introduced into the hollow opened needles. The needles are opened, for this purpose, by wedge-shaped pushers contained in the needles, and the pushers get their movement from a cam-disk. In like manner the needles are driven by a second cam-disk.

A special small device serves for pressing the bacon into the box. This device consists of a box which can be set upon the box containing the knives, and a screw-press by means of which the bacon is pressed into the box wherein the bacon is cut.

The accompanying drawing shows a form of construction of the invention.

Figure 1 gives a partial sectional side-view of the machine. Fig. 2 is a top-view. Fig. 3 shows one of the needles pushed forward and open. Fig. 4 is a section on the line A—B of Fig. 1. Fig. 5 shows the device for pressing and cutting the bacon in the box.

The larding device consists of a guiding plate 1 fastened on a table and on which in the present form of construction four larding needles 2 are arranged. Each of the said needles consists of two parts, as shown in Fig. 3, the inside of which is suitable for the reception of strips of bacon. The needles are guided through a special guiding plate 3 into the meat, when driven forward by a device which is described hereafter.

Each half of the needles 2 is provided with a pin 4 which goes into the slits 5 which are in a cross-bar 6 movable backward and forward by a lever 8 which is pivoted at the point 7 actuated by a curve in a crank-disk 10 which receives its motion from the bevel gears 11 and 12, which are themselves moved by the axle 13 and by the crank-wheel 14. In the hollow or body of each needle a pusher 15, wedge-shaped at the front and back, is arranged with the front wedge touching the point 16, where the needle diminishes in size, and the back wedge lying against the back end of the needle in such a way that on moving the said pushers forward, the needles are opened into two parts which close by means of the springs 47, when the said pushers are drawn back. The pushers are set in motion by a cross-bar 17 into which the pins 18 of the pushers catch, and the said bar is moved by a lever 19 which is pivoted at the point 20 and the unattached end of which catches into the cam-track 21 of the cam-disk 10. Beneath the front of the said needles, slits 22 are provided in the guide-plate 1, and underneath these slits a box 24 is arranged in guides 23 for the reception of the bacon. This box has a number of partitions 25 which have sharpened edges 26 so that the bacon is cut into slices when it is pressed into the box. Projecting into the box are a number of plates 27 corresponding to the number of needles, which are fixed to a cross-bar 29 which moves with a sleeve 28. The cross-bar 29 has slits 30 through which two toothed bars 31 are passed and connected with the projecting arm 33 which are turnable at the point 32. The said levers bear, at their back ends, levers 34 which have slanting planes 35. By moving the rack-bars 31 up and down, the plates 27 are pressed intermittently into the respective partitions of the box 24 and the rack-bars 31 are so arranged that at every turn of the latter the cross-bar 29 together with the plates 27 move upward by just the thickness of a slice of bacon.

The slices of bacon coming out of the box are cut into strips by a double-edged knife 36 which is turnable at the pivot 37 actuated by a bar 38 which is connected with the crank-disk 39. This latter crank-disk is driven by the axle which bears the cam-disk 10 and the gear wheels 40 and 41 in such a way that, when the said cam disk turns once, the crank disk 39 makes only half a turn whereby the knife swings only once in the same time. As the connecting rod 38 is slotted at 42, the knife stops for awhile after each movement, in which time the needles do the larding.

The device for filling the box 24 with bacon (represented in Fig. 5) consists of a box-shaped guide 43 which is of the same size of the box 24 but minus the partitions. The guide is removed from the device shown in Fig. 5 and filled with bacon and placed on the box 24 which is drawn laterally from the guides 23. Both the boxes 43 and 24 are now pushed into the box 44 under the pressing piston 46 and the latter is moved downward by the screw 45 into the guide 43 whereby the bacon is driven out of the latter into the box 24 wherein the bacon is cut into slices by the knives 26 and enter into the partitions respectively.

The manner of larding is as follows: After filling the box 24 with bacon, the box is removed from the box 44, is separated from the guide 43, and pushed into the guides 23 of the plate 1. The plates 27 now touch the slices of bacon which are in the box 24, and if the box contains twelve slices of bacon and as represented the machine has four needles, the latter number of slices only are worked when the crank wheel 14 is turned. When this latter wheel is turned, the cam disk 10 rotates, actuated by the axle 13 and the bevel gears 11, 12, moving the needles and the pushers to and fro. Supposing each needle is opened by moving the respective pusher, as shown in Fig. 3, then a part of the bacon from the upper side of the box, enters the needle during the movement of the cross-bar 29 and the knife 36 moves under all the needles and cuts off the protruding bacon into strips so, that each needle is provided with one. The pushers 15 now go backward whereon the needles are closed by the springs 47 and the needles go forward and project from the guiding plate and enter into the meat laid in front of them. At this instant, the pushers 15 are driven forward by the cross-bar 17 causing their wedged-shaped planes to open the needles just as the latter start to go back, in consequence of the motion of the cam-disk 10, and stop in such a way that the bacon remains in the meat as the said pushers prevent it from returning with the needles. The pushers now go backward to such a distance that the slits 22, which are under the needles, are free and the needles remain open until the slices of bacon enter through the said slits into the needles, pressed by the plates 27. The knife 36 then moves in the opposite direction to its first motion and cuts the slices of bacon into strips so that each needle is again filled for repeating the work. The uplifting of the plates 27 is effected by the cross-bar 6 which, during its backward movement pushes against the slanting planes 35 of the pieces 34 causing the latter to move downward whereon the toothed-bar 31, actuated by the lever 33, is lifted. The springs 48 press the lever upward when the cross-bar moves a little forward in such a way that the toothed bars 31 move downward one cog. After the four slices of bacon are completely worked off, the cross-bar 29 is drawn out of the box together with the plates 27, and the box 24 is shifted in guides 23 (Fig. 1) so that new slices come under the plates ready for working.

Instead of four needles, any number can be employed, and in the same way the box 24 may contain more than twelve partitions.

The machine may be driven by hand or in any other suitable means.

I claim:

In a machine for larding meat and the like, the combination of a plate containing slits mounted on a table, needles comprising two parts and having projecting pins arranged on said table, a cross bar having slits slidably arranged on the table and adapted to actuate the needles by engaging with the pins which are inserted in the slits, springs arranged on said table for keeping the needles closed, pushers having projecting pins slidably arranged in each needle respectively, a cross bar engaging the pins of the pushers and slidably arranged on the table, a disk having cam tracks, a lever engaging in one of said cam tracks of said disk adapted to move the cross bar 6 to engage the said needles, another lever engaging in the other cam track of said disk to move the cross bar to engage the said pushers, a double edged knife movably arranged under said needles, an arm having a slit therein and operatively connected with said knife, a crank disk on which the said arm is revolubly mounted for moving the said parts, a plate adapted to guide the needles, a box having guides and knived partition walls inserted in said guides, and adapted to contain slices of bacon, plates arranged on an arm and located underneath said box for pushing the slices of bacon from the respective partitions of said box, sleeves having slits movably arranged under the said table for holding the said arm, levers having arms with oblique projections thereon, rack bars adapted to lift said plates by degrees, springs for maintaining the said levers in position and a crank wheel adapted to operate the said parts.

DANIEL DECHERT.

Witnesses:
WILHELM SPENGLER,
ENGELHARD LEUKROTH.